Nov. 11, 1958 D. A. DI TIRRO ET AL 2,859,735
SHIFTABLE MECHANISM WITH MOMENTARILY ACTUATED CONTROL
Filed March 18, 1955 3 Sheets-Sheet 1

INVENTORS
Domenic A. DiTirro
Raymond D. Ei.
BY
Harness, Dickey & Pierce.
ATTORNEYS

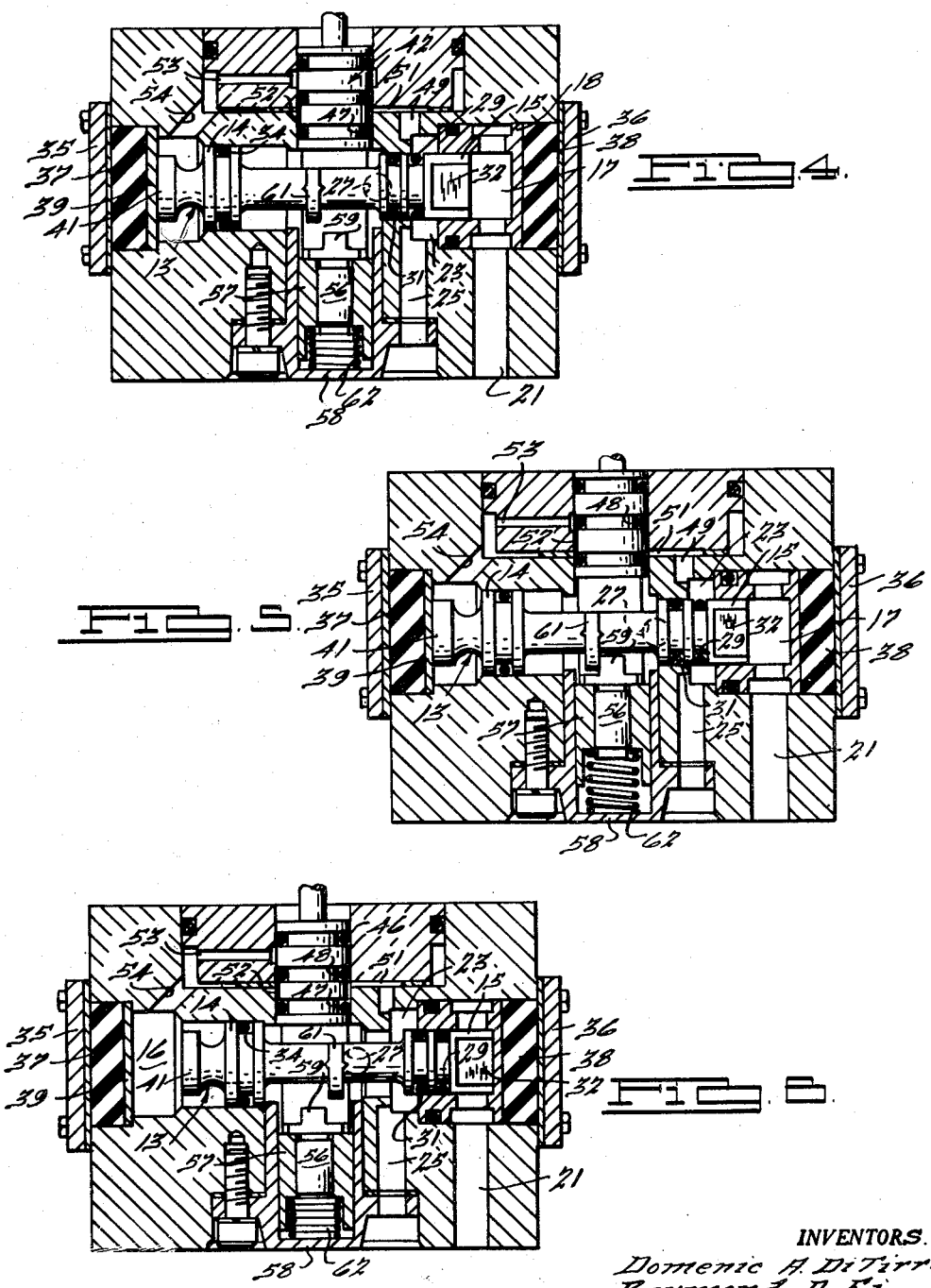

Nov. 11, 1958 D. A. DI TIRRO ET AL 2,859,735
SHIFTABLE MECHANISM WITH MOMENTARILY ACTUATED CONTROL
Filed March 18, 1955 3 Sheets-Sheet 3
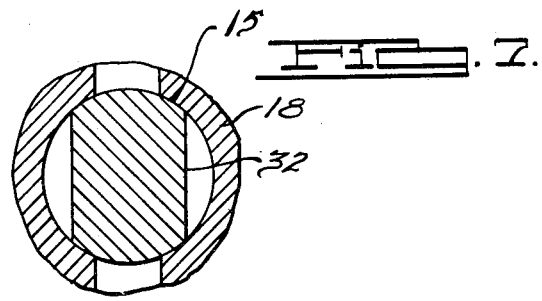
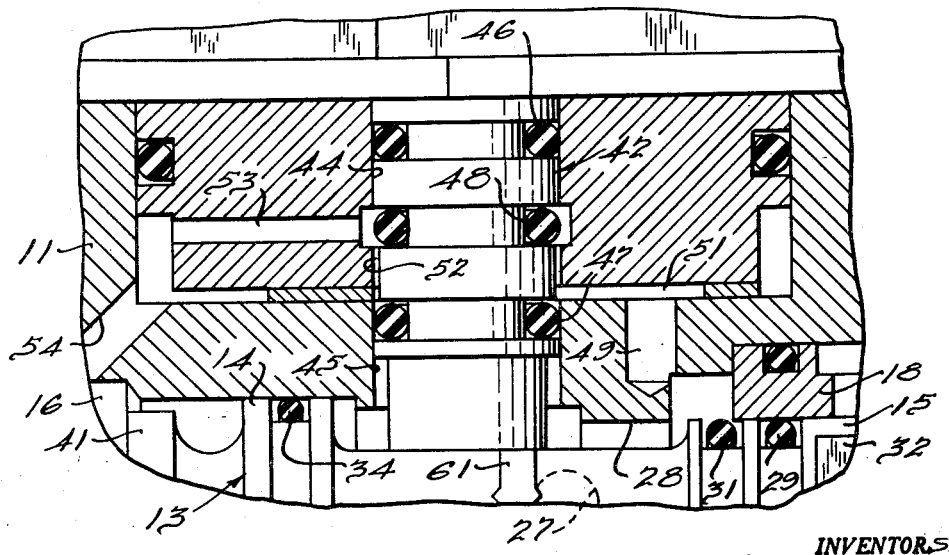
INVENTORS.
Domenic A. Di Tirro,
Raymond D. Ei.
BY
Harness, Dickey + Pierce.
ATTORNEYS.

United States Patent Office 2,859,735
Patented Nov. 11, 1958

2,859,735

SHIFTABLE MECHANISM WITH MOMENTARILY ACTUATED CONTROL

Domenic A. Di Tirro, Royal Oak, and Raymond D. Ei, Berkley, Mich., assignors to Ross Operating Valve Company, Detroit, Mich., a corporation of Michigan Application March 18, 1955, Serial No. 495,228

15 Claims. (Cl. 121—46.5)

This invention relates to the alternate actuation of devices, and more particularly to valves and other devices which are to be shifted alternately between two positions by momentary reciprocating movement of a control member.

It is an object of the invention to provide a compressible fluid-actuated mechanism of an improved nature which is alternately shiftable between two positions to perform any appropriate function, the shifting being controlled by the successive momentary actuation of a single solenoid or other reciprocating control element.

It is also an object of this invention to provide a valve for controlling the flow of compressible fluid to and from a fluid actuated device, the valve having novel and improved means for shifting it between its positions by momentary actuation of a single solenoid or other reciprocating control element, thus greatly reducing the number of parts and cost of manufacture.

It is another object to provide a mechanism of the above nature, in which the valve shifting is accomplished by compressible fluid pressure, so that a relatively small force is required from the solenoid.

It is also an object to provide a mechanism having the above characteristics which is safe and efficient in operation and eliminates the danger of accidental return of the mechanism to its original position when it is shifted, no matter how short the period of control member actuation.

Other objects, features, and advantages of the present invention will become apparent from the subsequent description, taken in conjunction with the accompanying drawings.

In the drawings:

Figure 4 is a cross-sectional view similar to Figure 1 showing the detent in retracted position with the valve shifted to supply position;

Figure 5 is a view similar to Figure 4 but showing the detent in its locking position after deenergization of the solenoid;

Figure 6 is a view similar to Figures 4 and 5 but showing the detent in its retracted position and the valve shifted to its exhaust position;

Figure 7 is a fragmentary cross-sectional view in elevation taken along the line 7—7 of Figure 1 and showing the flat-sided shape of the piston head; and Figure 8 is an enlarged fragmentary elevational view of the pilot spool and its associated parts.

Figure 1:
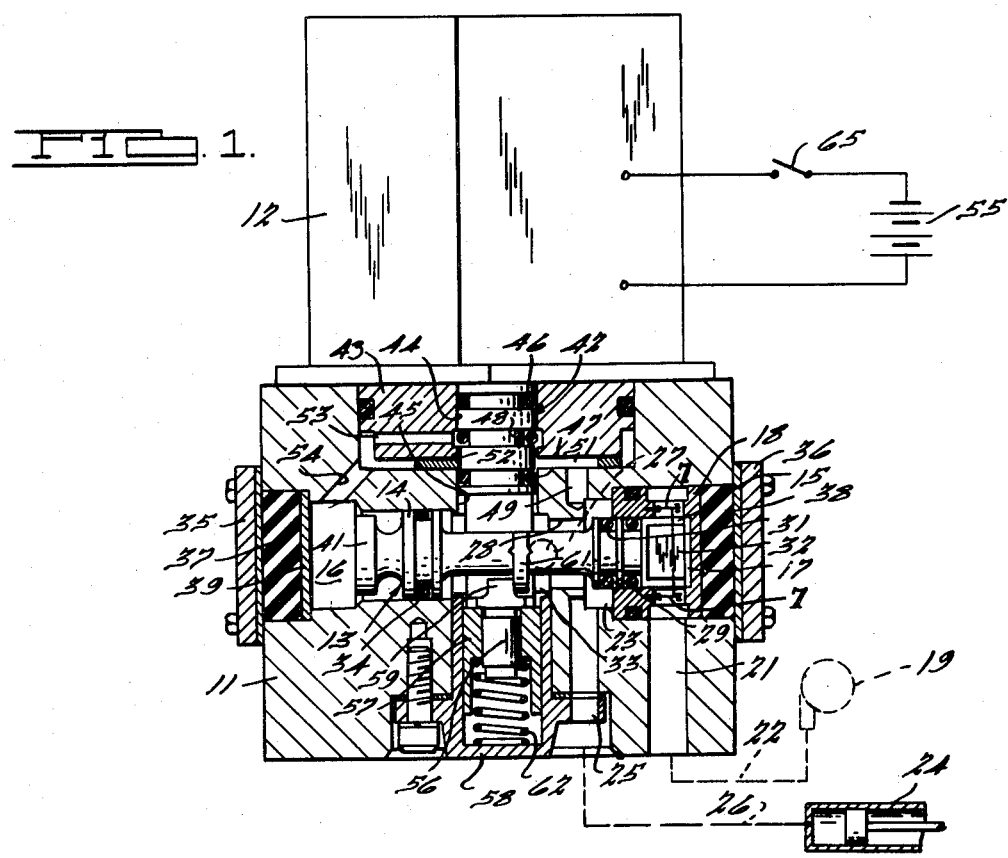
Figure 1 is an elevational view in cross section of a preferred embodiment of the invention, comprising a valve, showing its connection to a working cylinder, the valve being in its exhaust position.

The invention comprises means for operating an alternately movable compressible fluid-actuated reciprocating member. In the illustrated embodiment, this member is a spool type valve shiftable between a supply position connecting a supply port to a compressible fluid actuated or fluid receiving device, and an exhaust position connecting said device to exhaust. It will be understood however that other fluid-actuated reciprocating members, usable in a variety of ways for actuating or indicating purposes, could replace the illustrated spool valve within the purview of the invention. The valve is shiftable between its positions by means of differential piston areas at the opposite ends of the spool. A detent is provided for holding the spool in either its supply or its exhaust position, this detent being spring-urged into engagement with either side of a shoulder on the spool. A solenoid is provided for moving the detent into retracted position, permitting the differential pressures set up across the spool to shift the valve from one position to the other. Other types of reciprocating control members, including manually actuatable members, could replace the solenoid within the principles of the invention. Upon deenergization of the solenoid the detent is moved back into retaining position on the opposite side of the spool shoulder. The arrangement is such that the valve is moved quickly and effectively upon each energization of the solenoid. After each shifting of the valve, the detent moves into its retaining position before the pilot valve which controls the pressure differentials is effective to prepare the valve for its next shifting operation.

Referring to the drawings, the valve comprises a valve housing 11 surmounted by a solenoid 12 movable in a vertical direction. A valve spool generally indicated at 13 is slidably mounted within housing 11 for reciprocating movement on a horizontal axis. Spool 13 is provided with a relatively wide piston head 14 at one end thereof and a smaller area piston head 15 at the opposite end. Piston 14 is slidable in a chamber 16 formed in housing 11 while piston 15 is slidable in a chamber 17 formed in an insert 18 at the opposite end of the housing.

Chamber 17 is adapted to be connected to a source of compressible fluid pressure shown schematically at 19 by means of a port 21 and a conduit 22. A working chamber 23 is formed in housing 11 inwardly of insert 18. This chamber is adapted to be connected to a fluid actuated device 24 by means of a port 25 and a conduit 26. It will be understood that instead of controlling a fluid actuated device, valve spool 13 could be utilized to control a flow of compressible fluid to and from a fluid reservoir or other fluid receiving device, as a pilot valve to control the operation of a master valve, and in other applications where an actuating member shiftable between two positions is desired. An exhaust port 27 leads from housing 11, this port being shown in dotted lines in the various figures. Port 27 is disposed inwardly of working chamber 23, and a passage 28 interconnects the exhaust port and working chamber, this passage having an internal surface acting as a valve seat.

Valve spool 13 is movable between a right-hand position shown in Figures 1 and 6 and a left-hand position shown in Figures 4 and 5. When in its right-hand or exhaust position, working port 25 is connected to exhaust port 27. When the spool is in its left-hand or supply position, supply port 21 is connected to working port 25. To accomplish its functions, spool 13 is provided with a supply valve 29 and an exhaust valve 31. These valves, in the present embodiment, take the form of a pair of O-rings in spaced adjacent relation on spool 13 adjacent piston head 15. The latter is provided with a pair of flattened sides 32 which create fluid passageways between the piston and the bore of insert 18. Valve 29 is adjacent the inner end of piston 15, and when the spool is in its right-hand or exhaust position of Figures 1 and 6, this supply valve is seated within the bore of insert 18 which is disposed between supply chamber 17 and working chamber 23. Supply port 21 is thus effectively sealed off from working port 25. When spool 13 moves to its left-hand or supply position, valve 29 is removed from the bore of insert 18 and flats 32 of piston 15 connect supply chamber 17 and working chamber 23, as seen in Figures 4 and 5.

Exhaust valve 31 is positioned inwardly of supply valve 29 on spool 13. When the spool is in its left-hand or supply position, valve 31 is seated in bore 28 and thus seals off working chamber 23 from exhaust port 27. When the spool is moved to its right-hand position, valve 31 is withdrawn from seat 28 and working chamber 23 is connected to exhaust port 27. It should be noted that valves 29 and 31 are at all times effective to prevent a direct connection from supply chamber 17 to exhaust port 28.

A clearance bore 33 is provided within housing 11 in the vicinity of exhaust port 27, the purpose of which will later appear. Piston head 14 is provided with an O-ring 34 sealing chamber 16 from bore 33. The opposite ends of housing 11 are provided with caps 35 and 36 respectively, and a pair of shock absorbing members 37 and 38 are disposed inwardly of caps 35 and 36 for limiting the movement of spool 13. The left-hand shock absorbing member 37 has a wear-resistant surface member 39, and spool 13 is provided with a stop portion 41 which abuts member 39. The outer end of insert 18 is adjacent shock absorbing member 37 and is abutted by the end of piston 15 when spool 13 moves to its right-hand position.

The means for controlling the movement of spool 13 comprises a pilot valve generally indicated at 42 which is carried by housing 11 for movement at right angles to spool 13 by solenoid 12. In particular, housing 11 is provided with an insert 43 in its upper portion, valve 42 comprising a spool slidable within a bore 44 in insert 43 and a coaxial bore 45 in housing 11 which leads to bore 33. Spool 42 is provided with an upper O-ring 46 and a lower O-ring 47 which act as sealing members. Intermediate these sealing members is a valve member 48, this valve controlling the flow of compressible fluid to and from chamber 16.

Conduit means are provided leading between working chamber 23 and valve actuating chamber 16, pilot valve 48 controlling the opening and closing of this conduit means. In particular, a passageway 49 connects chamber 23 with a passageway 51 between insert 43 and housing 11. A passageway 52 is created by a reduced land between O-rings 47 and 48 on spool 42. This passageway connects passageway 51 with a passageway 53 in insert 43 when spool 42 is in its upper position shown in Figure 1. A passageway 54 in housing 11 connects passageway 53 with chamber 16.

When working chamber 23 and actuating chamber 16 are thus connected, the larger piston head 14 of spool 13 will be subjected to whatever pressure exists in working chamber 23. When pilot spool 42 is moved downwardly by energization of solenoid 12 from a power source 55, pilot valve 48 will be seated in the portion of bore 44 between passageways 51 and 53, thus sealing off actuating chamber 16. Since in operation the energization of solenoid 12 is momentary, the fact that there is no fluid flow during this energization means that any restrictive effect of the passageway areas will not interfere with the operation of the device. In other words, fluid flow through passageways 49 to 54 will take place only when the solenoid is deenergized which will normally be for longer periods than its momentary energization, and these passageways can therefore function effectively to prepare spool 13 for its next shift of position.

Actual shifting of spool 13 takes place when solenoid 12 is energized and pilot spool 42 is in its downward position of Figures 4 and 6. The upward movement of spool 42 serves to prepare the differential pressures in chambers 16 and 17 for the next shift of spool 13 when the solenoid is again energized. Means are provided for detaining spool 13 in its shifted position after each energization of solenoid 12, this detent means becoming effective as the solenoid is deenergized in each instance.

Figures 2, 3:
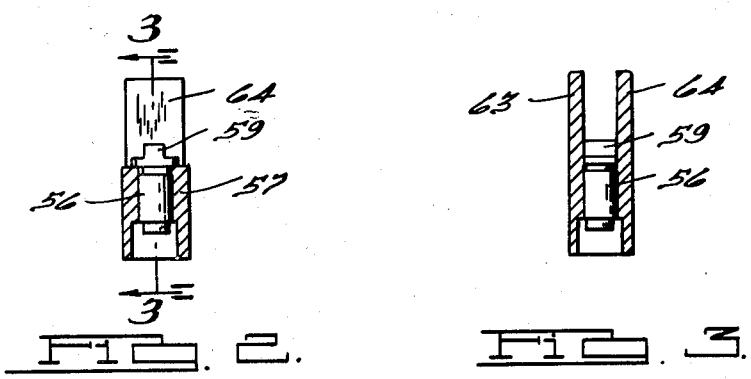
Figure 2 is a detailed elevational view in cross section of the detent and its sliding support, in the same plane as Figure 1.
Figure 3 is a cross-sectional view taken along the line 3—3 of Figure 2 and showing the forked end of the guide member.

The detent means is shown in its environment in Figure 1 and is shown in detail in Figures 2 and 3. A detent member 56 is secured within a slide 57 which is slidably mounted in an insert 58 in the lower end of housing 11. The detent and slide are movable coaxially with pilot spool 42, and detent 56 is provided with a projection 59 disposable in blocking relation with a shoulder 61 carried by the central portion of spool 13. A spring 62 disposed between slide 57 and the end of insert 58 urges the slide, as well as detent 56, into its blocking position. Slide 57 is provided with portions 63 and 64 which extend upwardly in forked fashion past spool 13 and are disposed beneath pilot spool 42. When spool 42 is moved downwardly by energization of solenoid 12, it engages extensions 63 and 64 to move slide 57 downwardly against the action of spring 62. In its lower position, as shown in Figures 4 and 6, detent 59 is in non-interfering relation with shoulder 61 so that spool 13 may slide from one position to the other. For purposes which will hereinafter appear, the relative dimensions of the parts are such that upon deenergization of solenoid 12, detent 59 is effective to lock spool 13 against movement before pilot valve 48 opens the conduit between working chamber 23 and actuating chamber 16. It should be noted that detent 59, spool shoulder 61, and extensions 63 and 64 of slide 57 all operate within the confines of central bore 33 in housing 11, this bore being sufficiently large for the required movements of the parts.

*Operation*

In normal operation solenoid 12 will be controlled by a manual switch 65 or by any other appropriate switching means, and will be momentarily energized each time it is desired to shift spool 13 between its supply and exhaust positions. Assume an initial condition in which spool 13 is in its exhaust position shown in Figure 1, with solenoid 12 deenergized. Under these circumstances fluid actuated device 24 is connected to exhaust by conduit 26, working port 25, working chamber 23, bore 28 and exhaust port 27. Since supply chamber 17 is sealed off by the position of supply valve 29, pressure in supply chamber 17 will be built up by pressure source 19. Actuating chamber 16 is connected to exhaust by means of passageways 54, 53, 52, 51 and 49, working chamber 23, bore 28 and exhaust port 27. This connection is permitted by the open positions of pilot valve 48 and exhaust valve 31. The pressure differential between chambers 17 and 16, which would normally cause spool 13 to move to the left, is prevented from doing so by the locking position of detent 59 which engages shoulder 61 of the spool. The valve is thus readied for movement to the left when detent 59 is withdrawn.

On momentary energization of solenoid 12, spool 42 is moved downwardly, engaging extensions 63 and 64 of slide 57. This causes the slide, as well as detent 59, to move downwardly so that the detent is in retracted position as shown in Figure 4. The pressure in supply chamber 17 will cause spool 13 to move to the left until stop 41 abuts surface 39. This movement will cause immediate opening of supply valve 29 so that fluid can flow from supply chamber 17 past flats 32 of piston 15 into working chamber 23. From the working chamber, the fluid will flow to compressible fluid actuated device 24 through working port 25. Exhaust valve 31 will move to closed position sealing exhaust port 27 from working chamber 23. Actuating chamber 16 will be sealed off from working chamber 23 by means of pilot valve 48. This sealing will cause a slight increase in pressure within chamber 16 as piston 14 moves to the left. The relative dimensions of pistons 14 and 15 is preferably such that this slight increase in pressure will not detract from the rapid full-stroke movement of spool 13. It should be noted that solenoid 12 does not exert force directly on spool 13 to cause its shift, but that the shifting is created by the pressure differentials set up in the mechanism. The length of stroke is sufficient to carry shoulder 61 past detent 59.

Upon deenergization of solenoid 12 detent 59 is returned to its blocking position by spring 62 so that spool 13 is retained in its supply position, as shown in Figure 5. Pilot valve 48 is returned to its open position, this action taking place after detent 59 is effective to block movement of spool 13. Working chamber 23 is thus connected with actuating chamber 16 by means of passageways 49, 51, 52, 53 and 54. Since working chamber 23 is connected to supply chamber 17, pressure in actuating chamber 16 is built up in accordance with the fluid pressure supply. Since the area of piston 14 is larger than the area of piston 15, the pressure differential resulting will urge spool 13 to the right, this movement being prevented by detent 59. The valve is thus retained in its supply position, with working port 25 being connected to supply port 21, but is readied for movement to its exhaust position upon the next energization of solenoid 12.

When solenoid 12 is again energized, detent 59 will be withdrawn from its blocking engagement with shoulder 61 of spool 13. The pressure differential described above will cause spool 13 to move to the right, thus closing supply valve 29 and opening exhaust valve 31. The fluid actuated device will thus be again connected with exhaust port 27 as shown in Figure 6. The closure of pilot valve 48 will retain the pressure within actuating chamber 16 so that spool 13 is held in its rightward position, the relative piston areas being so chosen as to take into account the slight decrease in pressure in chamber 16 due to movement of piston 14. Upon deenergization of solenoid 12, detent 59 will be returned to its blocking position as shown in Figure 1. Pilot valve 48 will open to connect actuating chamber 16 to exhaust as described previously, this action taking place after detent 59 is effective to prevent movement of spool 13.

It will thus be seen that a simple and efficient mechanism is provided for rapidly shifting a valve or other reciprocating member between two positions upon momentary actuation of a reciprocating control member, the device being of safe and foolproof construction. While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a device of the class described, a spool movable between two positions, a pair of pistons formed at axially spaced positions on said spool, one of said pistons being of smaller effective area than the other, a first chamber in which said one piston is slidably disposed, means for connecting said first chamber to a source of compressible fluid pressure, a second chamber in which said other piston is slidably disposed, a third chamber, an exhaust port, a first connection between said first and third chambers, a second connection between said third chamber and said exhaust port, a pair of valves carried by said spool, one of said valves being disposed in said first connection, the other valve being disposed in said second connection, shifting of said spool toward said first chamber causing said first valve to close and said second valve to open, shifting of said spool toward said second chamber causing said first valve to open and said second valve to close, a conduit between said third chamber and said second chamber, a pilot valve in said conduit, a detent lock for positively locking said spool in either of its positions, means for moving said pilot valve to its closed position and immediately thereafter moving said detent lock to its retracted position, and means for moving said detent lock to its locking position and immediately thereafter returning said pilot valve to its open position.

2. In a device of the class described, a spool movable between two positions, a pair of pistons formed at axially spaced positions on said spool, one of said pistons being of smaller effective area than the other, a first chamber in which said one piston is slidably disposed, means for connecting said first chamber to a source of compressible fluid pressure, a second chamber in which said other piston is slidably disposed, a third chamber, an exhaust port, a first connection between said first and third chambers, a second connection between said third chamber and said exhaust port, a pair of valves carried by said spool, one of said valves being disposed in said first connection, the other valve being disposed in said second connection, shifting of said spool toward said first chamber causing said first valve to close and said second valve to open, shifting of said spool toward said second chamber causing said first valve to open and said second valve to close, a conduit between said third chamber and said second chamber, a pilot valve in said conduit, a detent lock for positively locking said spool in either of its positions, a solenoid energizable for moving said pilot valve to its closed position and immediately thereafter moving said detent lock to its retracted position, and resilient means for moving said detent lock to its locking position and immediately thereafter returning said pilot valve to its open position.

3. In a device of the class described, a housing, a spool slidable in said housing between two positions, a pair of pistons formed at axially spaced positions on said spool, one of said pistons being of smaller diameter than the other, a first chamber in said housing in which said one piston is slidably disposed, means for connecting said first chamber to a source of compressible fluid pressure, a second chamber in said housing in which said other piston is slidably disposed, a third chamber in said housing between said first two chambers, an exhaust port in said housing between said third chamber and said second chamber, a first connection between said first and third chambers, a second connection between said third chamber and said exhaust port, a pair of valves carried by said spool, one of said valves being disposed in said first connection, the other valve being disposed in said second connection, shifting of said spool toward said first chamber causing said first valve to close and said second valve to open, shifting of said spool toward said second chamber causing said first valve to open and said second valve to close, a conduit in said housing between said third chamber and said second chamber, a pilot valve in said conduit, a detent for locking said spool in either of its positions, means for simultaneously moving said pilot valve to its closed position and said detent to its retracted position, and means for simultaneously returning said pilot valve to its open position and said detent to its locking position.

4. In a device of the class described, a housing, a spool slidable in said housing between two positions, a pair of pistons formed at opposite ends of said spool, one of said pistons being of smaller diameter than the other, a chamber in said housing in which said one piston is slidably disposed, means for connecting said chamber to a source of compressible fluid pressure, a second chamber in said housing in which said other piston is slidably disposed, a third chamber in said housing between said first two chambers, an exhaust port in said housing between said third chamber and said second chamber, a pair of valves carried by said spool, one of said valves being disposed between said first and third chambers, the other valve being disposed between said third chamber and said exhaust port, shifting of said spool toward said first chamber causing said first valve to close and said second valve to open, shifting of said spool toward said second chamber causing said first valve to open and said second valve to close, a conduit in said housing between said third chamber and said second chamber, a pilot valve in said conduit, said pilot valve being slidable in said housing at right angles to said spool, a detent for locking said spool in either of its positions, said detent being movable coaxially with said pilot valve into locking engagement with an intermediate portion of said spool, means for simultaneously moving said pilot valve to its closed position and said detent to its retracted position, and means for simultaneously returning said pilot valve to its open position and said detent to its locking position.

5. The combination according to claim 4, said pilot valve being disposed on one side of said spool, said detent being disposed on the opposite side of said spool, a slide carrying said detent, and a forked extension on said slide engageable by said pilot valve, said spool being movable within said forked extension.

6. The combination according to claim 5, said housing being further provided with a central bore for accommodating said detent and the central portion of said spool, said exhaust port being connected to said central bore.

7. In a device of the class described, a housing, a spool slidable in said housing between two positions, means at the opposite ends of said housing for limiting the movement of said spool, said last-mentioned means comprising bodies of shock absorbing material, a pair of pistons formed at opposite ends of said spool, one of said pistons being of smaller diameter than the other, a chamber in said housing in which said one piston is slidably disposed, means for connecting said chamber to a source of compressible fluid pressure, a second chamber in said housing in which said other piston is slidably disposed, a third chamber in said housing between said first two chambers, an exhaust port in said housing between said third chamber and said second chamber, a pair of valves carried by said spool, one of said valves being disposed between said first and third chambers, the other valve being disposed between said third chamber and said exhaust port, shifting of said spool toward said first chamber causing said first valve to close and said second valve to open, shifting of said spool toward said second chamber causing said first valve to open and said second valve to close, a conduit in said housing between said third chamber and said second chamber, a pilot valve in said conduit, a detent for locking said spool in either of its positions, means for simultaneously moving said pilot valve to its closed position and said detent to its retracted position, and means for simultaneously returning said pilot valve to its open position and said detent to its locking position.

8. In a device of the class described, a housing, a spool slidable in said housing between two positions, a pair of pistons formed at opposite ends of said spool, one of said pistons being of smaller diameter than the other, a chamber in said housing in which said one piston is slidably disposed, mean for connecting said chamber to a source of compressible fluid pressure, a second chamber in said housing in which said other piston is slidably disposed, a third chamber in said housing between said first two chambers, an exhaust port in said housing between said third chamber and said second chamber, a pair of valves carried by said spool, one of said valves being disposed between said first and third chambers, the other valve being disposed between said third chamber and said exhaust port, shifting of said spool toward said first chamber causing said first valve to close and said second valve to open, shifting of said spool toward said second chamber causing said first valve to open and said second valve to close, said first-mentioned piston having a flattened surface, whereby said first and third chambers are connected when said first valve is in its open position, a conduit in said housing between said third chamber and said second chamber, a pilot valve in said conduit, a detent for locking said spool in either of its positions, means for simultaneously moving said pilot valve to its closed position and said detent to its retracted position, and means for simultaneously returning said pilot valve to its open position and said detent to its locking position.

9. In a device of the class described, a spool movable between two positions, a pair of pistons formed at opposite ends of said spool, one of said pistons being of smaller diameter than the other, a first chamber in which said one piston is slidably disposed, means for connecting said first chamber to a source of compressible fluid pressure, a second chamber in which said other piston is slidably disposed, a third chamber, means for connecting said third chamber to a fluid-actuated device, an exhaust port, a first connection between said first and third chambers, a second connection between said third chamber and said exhaust port, a pair of valves carried by said spool, one of said valves being disposed in said first connection, the other valve being disposed in said second connection, shifting of said spool toward said first chamber causing said first valve to close and said second valve to open, shifting of said spool toward said second chamber causing said first valve to open and said second valve to close, a conduit between said third chamber and said second chamber, a pilot valve in said conduit, a detent for locking said spool in either of its positions, means for simultaneously moving said pilot valve to its closed position and said detent to its retracted position, and means for simultaneously returning said pilot valve to its open position and said detent to its locking position.

10. In a device of the class described, a spool movable between two positions, a pair of pistons formed at opposite ends of said spool, one of said pistons being of smaller diameter than the other, a first chamber in which said one piston is slidably disposed, means for connecting said first chamber to a source of compressible fluid pressure, a second chamber in which said other piston is slidably disposed, a third chamber, means for connecting said third chamber to a fluid-actuated device, an exhaust port, a first connection between said first and third chambers, a second connection between said third chamber and said exhaust port, a pair of valves carried by said spool, one of said valves being disposed in said first connection, the other valve being disposed in said second connection, shifting of said spool toward said first chamber causing said first valve to close and said second valve to open, shifting of said spool toward said second chamber causing said first valve to open and said second valve to close, a conduit between said third chamber and said second chamber, a pilot valve in said conduit, a detent for locking said spool in either of its positions, a solenoid energizable for simultaneously moving said pilot valve to its closed position and said detent to its retracted position, and resilient means for simultaneously returning said pilot valve to its open position and said detent to its locking position.

11. A momentarily actuated three-way valve comprising a housing, a supply chamber at one end of said housing, means for connecting said supply chamber to a source of compressible fluid pressure, a working chamber spaced inwardly of said supply chamber, means for connecting said working chamber to a fluid-actuated device, a central bore in said housing inwardly of said working chamber, an exhaust port connected to said central bore, an actuating chamber at the end of said housing opposite said supply chamber, a spool slidable within said housing between two extreme positions, said spool having a piston of relatively small diameter slidable within said supply chamber and a piston of relatively large diameter slidable within said actuating chamber, a supply valve carried by said spool between said supply chamber and said working chamber, an exhaust valve carried by said spool between said working chamber and said central bore, said supply valve being closed and said exhaust valve opened when said spool is shifted toward said supply chamber, said exhaust valve being closed and said supply valve opened when said spool is shifted toward said actuating chamber, a conduit between said working chamber and said actuating chamber, a pilot valve in said housing, a solenoid energizable to move said pilot valve to a position closing said conduit, a detent in said housing, a shoulder on said spool within said central bore, a spring urging said detent into blocking engagement with either side of said shoulder, and means connecting said detent and said pilot valve, whereby energization of said solenoid will cause retraction of said detent and deenergization of said solenoid will cause opening of said pilot valve by said spring, the relation of the parts being such that said detent is effective to block movement of said spool before said pilot valve is opened, whereby successive momentary energizations of said solenoid will cause said working chamber to be alternately connected to supply and exhaust.

12. In a device of the class described, a member shiftable alternately between two positions, means for holding said member in one position, means for creating a force on said member when in said one position urging it to the other position, said holding means preventing said force from being effective, means for momentarily retracting said holding means to permit said force to become effective to move said member to its other position, means for returning said holding means to hold said member in said other position, and means responsive to return of said holding means to its holding position for creating a force urging said member to its first position.

13. In a device of the class described, a member shiftable alternately between two positions, means for holding said member in one position, fluid control means for creating a pressure differential on said member when in said one position urging it to the other position, said holding means preventing said force from being effective, means for momentarily retracting said holding means to permit said pressure differential to become effective to move said member to its other position, means for returning said holding means to hold said member in said other position, and means responsive to return of said holding means to its holding position for creating a pressure differential urging said member to its first position.

14. In a device of the class described, a member shiftable alternately between first and second positions, means for holding said member in either of said positions, said holding means being movable between a retracted position and a holding position, compressible fluid control means movable together with said holding means to a first position when said holding means is in its retracted position and to a second position when said holding means is in its holding position, said control means creating a pressure differential on said member when the control means is in its second position and said member is in its first position urging said member toward its second position, said holding means preventing said force from being effective, means for momentarily moving said holding means to its retracted position to permit said pressure differential to become effective to move said member to its second position, means for returning said holding means to hold said member in said second position, and means responsive to movement of said control means to its first position and then to its second position together with said holding means for creating a pressure differential urging said member to its first position.

15. In a device of the class described, a spool movable between two positions, constant-pressure means constantly urging said spool toward a first position, a piston on said spool, a return chamber in which said piston is slidably disposed, pressure in said return chamber causing said spool to move to its second position against the action of said constant-pressure means, a pressure port, an operating chamber and an exhaust port adjacent said spool, a first valve on said spool between said pressure port and said operating chamber, a second valve on said spool between said operating chamber and said exhaust port, movement of said spool toward its first position causing said first valve to open and said second valve to close, movement of said spool toward its second position causing said first valve to close and said second valve to open, a conduit between said operating chamber and said return chamber, a pilot valve in said conduit, a detent lock for positively locking said spool in either of its positions, means for moving said pilot valve to its closed position and immediately thereafter moving said detent lock to its retracted position, and means for moving said detent lock to its locking position and immediately thereafter returning said pilot valve to its open position.

References Cited in the file of this patent
UNITED STATES PATENTS

| | | |
|---|---|---|
| 393,596 | Westinghouse | Nov. 27, 1888 |
| 2,672,886 | Crookston | Mar. 23, 1954 |